(12) United States Patent
Sizov et al.

(10) Patent No.: US 11,226,305 B2
(45) Date of Patent: Jan. 18, 2022

(54) METHOD FOR SELECTIVELY DETERMINING THE CONCENTRATION OF GASEOUS MERCAPTAN-CONTAINING AND/OR AMINO-CONTAINING COMPOUNDS

(71) Applicant: Printeltech LLC, Moscow (RU)

(72) Inventors: Alexey Sergeevich Sizov, Novocherkassk (RU); Daniil Sergeevich Anisimov, Moscow (RU); Askold Albertovich Trul, Zhukovsky (RU); Victoriya Petrovna Chekusova, Otradny (RU); Aleksandr Anatolevich Permyakov, Moscow (RU); Mikhail Yurevich Yablokov, Moscow (RU); Aleksey Andreevich Vasilev, Moscow (RU); Elena Valerievna Agina, Moscow (RU); Sergey Anatolevich Ponomarenko, Moscow (RU)

(73) Assignee: Printeltech LLC, Moscow (RU)

( * ) Notice: Subject to any disclaimer, the term of this patent is extended or adjusted under 35 U.S.C. 154(b) by 36 days.

(21) Appl. No.: 16/954,555

(22) PCT Filed: Dec. 11, 2018

(86) PCT No.: PCT/RU2018/000807
§ 371 (c)(1),
(2) Date: Jun. 17, 2020

(87) PCT Pub. No.: WO2019/125214
PCT Pub. Date: Jun. 27, 2019

(65) Prior Publication Data
US 2021/0164933 A1  Jun. 3, 2021

(30) Foreign Application Priority Data
Dec. 18, 2017 (RU) .......................... RU2017144284

(51) Int. Cl.
*G01N 27/414* (2006.01)

(52) U.S. Cl.
CPC ............................... *G01N 27/4141* (2013.01)

(58) Field of Classification Search
CPC ............ G01N 27/4141; G01N 27/407; G01N 27/414; G01N 27/4168; G01N 33/497; G01N 33/0036; G01N 33/0044
See application file for complete search history.

(56) References Cited

U.S. PATENT DOCUMENTS

2008/0300501 A1 * 12/2008 Willard .............. G01N 27/4143
600/532
2011/0239735 A1 10/2011 Setayesh et al.

FOREIGN PATENT DOCUMENTS

RU 2398222 C1 8/2010

* cited by examiner

Primary Examiner — Gurpreet Kaur
(74) Attorney, Agent, or Firm — Boyle Fredrickson S.C.

(57) ABSTRACT

Use: detecting the presence of small concentrations of target gases. A method for selectively determining the concentration of gaseous mercaptan-containing and/or amino-containing compounds using a gas sensor based on an organic field-effect transistor is characterized in that the magnitude of a current in the channel of an organic field-effect transistor is measured in a time-dependent manner; the magnitude of a threshold opening voltage of the organic field-effect transistor and the magnitude of the charge carrier mobility are calculated in a time-dependent manner on the basis of the data regarding the time-dependent magnitude of the current in the channel of the organic field-effect transistor; the magnitude of the relative change in charge carrier mobility and the magnitude of the shift in the threshold opening voltage of the organic field-effect transistor are calculated; a detectable mercaptan-containing and/or amino-containing compound is determined according to the value of the magnitudes of the relative change in charge carrier mobility and of the shift in the threshold opening voltage of the organic field-effect transistor; the concentration of the detectable mercaptan-containing compound is determined according to the magnitude of the relative change in charge carrier mobility, and/or the concentration of the detectable amino-containing compound is determined according to the shift in the threshold opening voltage of the organic field-effect transistor. Technical result: creation of a device for the independent selective measurement of small concentrations (from 10 ppb to 1 ppm) of mercaptan-containing and/or amino-containing compounds in atmospheric air or in gas mixtures.

5 Claims, 8 Drawing Sheets

METHOD FOR SELECTIVELY DETERMINING THE CONCENTRATION OF GASEOUS MERCAPTAN-CONTAINING AND/OR AMINO-CONTAINING COMPOUNDS

FIELD OF THE INVENTION

The invention relates to gas sensors based on organic field-effect transistors able to determine target gases at low concentration.

More particularly the invention relates to highly-sensitive gas sensors for selective determination of concentration of toxic chemical gaseous compounds containing mercapto- (HS—) and/or amino group ($NH_2$—) within the range from 10 ppb to 1 ppm in the air.

The claimed gas sensors can be used as a key element in different stationary, portable and personal gas analyzers used in safety systems for air monitoring. Gas sensor based devices can either be involved in built-in intelligent systems constructed according to IoT (Internet of Things) principle within the concept of "smart house", or can be utilized in retail networks and food storages for monitoring meat and fish spoilage at early stages ("Modern Methods Analysis for Meat and Meat Products", G. O. Ezhkova, KNITU, Kazan, 2013; SanPiN 2.3.2.560-96 "Hygienic Requirements to Quality and Safety for Raw Food and Food products").

BACKGROUND

Necessity to measure low concentrations of toxic compounds containing mercapto- (HS—) and/or amino group ($NH_2$—) exists for a variety of industrial and household applications. For instance, daily average threshold limit value (TLV) in human settlement air is 0.04 $mg/m^3$ (64 ppb) for ammonia and 0.008 $mg/m^3$ (6 ppb) for hydrogen sulphide. Detection of TLV excess in residential areas near industrial facilities is a crucial task.

In household the necessity of highly precise detection of toxic compounds containing mercapto- and/or amino group occurs, in particular, for determination of food spoilage at early stages when the measured concentrations of evolving toxic gases are very low to be determined organoleptically.

Gas sensors based on organic field-effect transistors (OFET) as a key element of gas analyzing systems usage is preferable, since it is able to combine high sensitivity with low power consumption that leads to portable microelectronic devices.

It is known a gas sensor based on organic field-effect transistor, which structure has an additional dielectric layer located above drain and source electrodes and organic semiconductor. During the device operation target chemical compound molecules can be adsorbed at the additional dielectric layer, it leads to the local permittivity changes and it causes changing of the device electrical current. Selectivity of the sensor is reached by modification of the additional dielectric layer with a receptor specific to the target chemical compounds. [application US20090267057A1, publication date 29 Oct. 2009].

This sensor disadvantage is presence of the additional dielectric layer that leads to the device architecture and technology complexity and subsequently to over cost.

It is known an OFET-based gas sensor fabricated from polycrystalline silicon including an air gap with 5000 V/cm electric field.

This gas sensor can be used for $NH_3$, $NO_2$, humidity or smoke detection in gaseous or liquid media. [patent RU 2398222C2, publication date 7 Jul. 2005].

This sensor disadvantage is its weak sensitivity (limit of detection is above 1 ppm) as well as the lack of sensor selectivity.

It is known an OFET-based gas sensor fabricated on rigid or flexible substrate. The device sensitive element is gate insulator, which electrical properties modify by interaction with the target chemical compound in gaseous or liquid phase [application EP2239561A1, publication date 13 Oct. 2010].

This sensor disadvantage is its sensitivity only to ammonia at relatively high concentrations above 100 ppm.

It is known an OFET-based chemical sensor with a receptor layer formed by self-organizing biomolecules located between a semiconductor layer and a substrate [U.S. Pat. No. 9,575,029B2, publication date 21 Feb. 2017].

This sensor disadvantage is organic-compound-based receptor layer instability under chemical and thermal exposure that leads to further functional layers coating complexity, for instance semiconductor layer, leading to increased complexity and cost.

It is known a gas sensor fabricated by printing technique and intended for food spoilage detection. The sensor sensitive material is metalloporphyrin-based dye interacting with nanoporous matrix. The matrix impedance is changed by interacting with the target gas signalized about the food spoilage [application US20170052160 A1, publication date 23 Feb. 2017].

This sensor disadvantage is the lack of the printed device sensitivity.

The closest to the claimed technical solution is the device for NO low concentrations detection in liquid or exhaled breath, composed of processor with an OFET-based gas sensor including a receptor layer coating above half of semiconducting layer. Importantly to tote that the threshold voltage shift is used as a sensor response while current value is usually measured as a target signal. This is a particular specification of the approach since baseline drift of this parameter is less than base line drift of a current. [U.S. Pat. No. 8,623,281B2, publication date 7 Jan. 2014].

This sensor disadvantage is its low selectivity as well as the presence of the additional complex receptor layer complicating the sensor fabrication and, consequently, increased cost.

SUMMARY OF THE INVENTION

The claimed invention is the fabrication of highly-sensitive device for selective determination of gas concentration using OFET-based gas sensor to measure concentration of one and/or two gases, namely amino-containing compounds, e.g. ammonia or other chemical compounds containing amino group, and thiol-containing compounds, e.g. hydrogen sulphide or other compounds, containing mercapto group in atmospheric air or gas mixtures within the concentration range from 10 ppb to 1 ppm and techniques for its realization.

Moreover, the claimed invention allows to determine low concentrations (from 10 ppb to 1 ppm) of two gases, namely, thiol-containing and/or amino-containing compounds in atmospheric air or gas mixtures independently and simultaneously or each of gases separately.

The invented method uses measurement of OFET drain current with time; calculation of OFET threshold voltage and charge carrier mobility values with time based on measurements of OFET drain current with time; calculation of relative carrier mobility change and OFET threshold voltage shift, determine target thiol-containing and/or amino-containing compound by the values of relative carrier mobility change and OFET threshold voltage shift; determine thiol-containing compound concentration by the value of relative carrier mobility change and/or amino-containing compound by the values of OFET threshold voltage shift.

In the particular embodiment, the invented technique is measurement of OFET drain current with time while gate voltage is constant and drain voltage is a saw-tooth-like signal.

The claimed invention for selective determination of gaseous thiol-containing and/or amino-containing compounds concentration is the device composed of OFET-based gas sensor consisted of source and drain electrodes separated by semiconductor, gate electrode and gate insulator; measuring unit connected to OFET-based gas sensor and capable to measure OFET drain current with time; microprocessor connected to measuring unit and capable to calculate OFET threshold voltage and charge carrier mobility values with time based on measurements of OFET drain current with time, to calculate of relative carrier mobility change and OFET threshold voltage shift, to determine target thiol-containing and/or amino-containing compound by the values of relative carrier mobility change and OFET threshold voltage shift and to determine thiol-containing compound concentration by the value of relative carrier mobility change and/or amino-containing compound by the values of OFET threshold voltage shift; airtight chamber with gas inlet and outlet where mentioned above gas sensor, measuring unit and microprocessor are taken place.

Selective determination of gaseous compound concentration is possible due to different electrical characteristics of the OFET-based gas sensor are changed at presence of gases with different chemical structure in the environment. Moreover, it is found that charge carrier mobility change is the indicator of thiol-containing compounds presence in ambient air and OFET threshold voltage shift, while the charge carrier mobility remains constant, is caused by presence of amino-containing compounds in ambient air.

In the particular embodiment, the invented gas sensor consists of semiconductor self-assemble monolayer based on organosilicon chemically inert and soluble in organic solvents derivatives of oligothiophenes, benzothienobenzothiophenes or bisphenyl-bithiophenes.

In the particular embodiment, the invented gas sensor consists of semiconductor layer with thickness to be in range of 2-20 nm.

BRIEF DESCRIPTION OF THE DRAWINGS

Invention implementation is supported by the drawings illustrating as follows.

Figure 1:
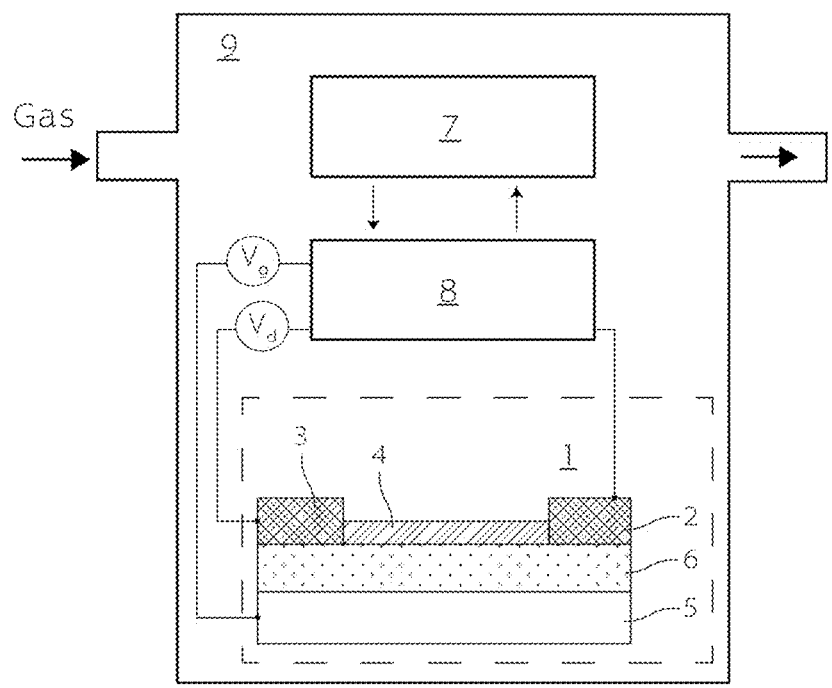
FIG. 1—illustrates the scheme of the device for selective determination of concentration of gaseous thiol-containing and/or amino-containing compounds.

The items in FIG. 1 are denoted as follows:
1—OFET-based gas sensor; 2—drain electrode; 3—source electrode; 4—organic semiconductor layer; 5—gate electrode; 6—dielectric layer; 7—microprocessor; 8—measuring unit; 9—airtight chamber.

Figure 2:
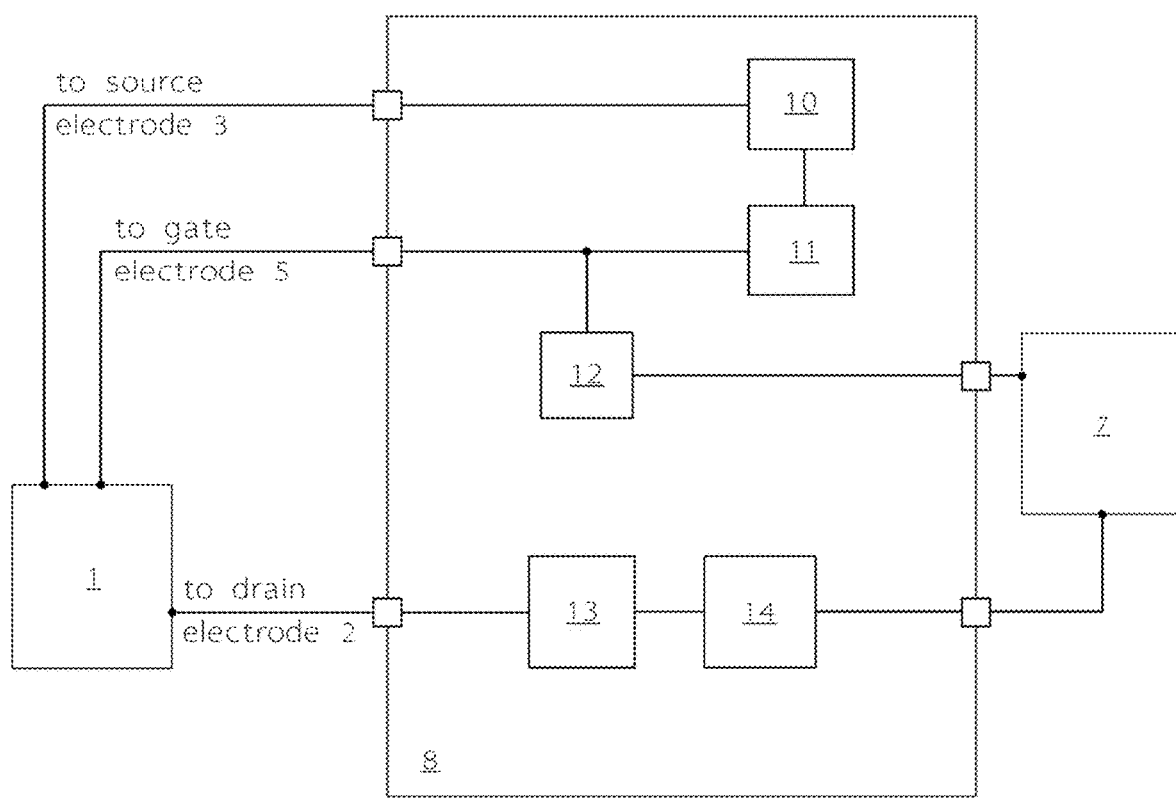
FIG. 2—illustrates the scheme of the measuring unit.

The items in FIG. 2 are denoted as follows:
1—OFET-based gas sensor; 7—microprocessor; 8—measuring unit; 10—power source; 11—blocking oscillator; 12—synchronization unit; 13—ammeter; 14—amplifier.

DETAILED DESCRIPTION OF THE INVENTION

The device for selective determination of concentration of gaseous thiol-containing and/or amino-containing compounds illustrated in FIG. 1, composed of the OFET-based gas sensor 1, consisting of drain electrode 2, source electrode 3, separated by organic semiconductor layer 4, gate electrode 5 and gate insulator 6, microprocessor 7, measuring unit 8 connected to the OFET-based gas 1 and microprocessor 7, airtight chamber 9 with gas inlet and outlet, where the OFET-based gas sensor 1, microprocessor 7 and measuring unit 8 are taken place.

In the preferable embodiment of the invention the measuring unit 8 (FIG. 2) composed of a power unit 10 which output is connected to the input of the blocking oscillator 11, synchronization unit 12, which input is connected to the output of the blocking oscillator 11, ammeter 13, which output is connected to the input of the amplifier 14. The power unit 10 output is connected to the drain electrode 3 of the OFET-based gas sensor r 1, the blocking oscillator 11 output is connected to the gate electrode 5 of the OFET-based gas sensor 1, the ammeter 13 input is connected to the source electrode 2 of the OFET-based gas sensor 1. The synchronization unit 12 output is connected to the first input of the microprocessor 7, and the amplifier 14 output is connected to the second input of the microprocessor 7. The measuring unit 8 enables to measure OFET drain current with time.

The microprocessor 7 can be made on the standard microelement base with a software for:

Determination of the OFET threshold voltage and charge carrier mobility values over the time based on measurements of OFET drain current with time;

calculation of relative carrier mobility change and OFET threshold voltage shift;

determination of the detected thiol-containing and/or amino-containing compound by the relative change of charge carrier mobility and threshold voltage of the organic field-effect transistor;

determination of the concentration of the detected thiol-containing and/or amino-containing compound by the relative change of the charge carrier mobility and the threshold voltage of the organic field-effect transistor.

Microprocessor 7 is connected to the user's information output device (monitor, display, etc.) (not shown in the drawings).

In the preferable embodiment of the invention the organic semiconductor layer 4 is a self-organized monolayer and can be made of organosilicon chemically inert and soluble in organic solvents derivatives of oligothiophenes, benzothienbenzothiophenes or bisphenyl-bithiophenes, such as 1,3-bis[11-(5'''-hexyl-2,2':5',2'':5'',2'''-quatrothiophene-5-yl)undecyl]-1,1,3,3-tetramethyldisiloxane, 1,3-bis[11-([1]benzothien[3,2-b][1]benzothien-2-yl)undecyl]-1,1,3,3-tetramethyldisiloxane, 1,3-bis[11-(7-hexyl[1]benzothien[3,2-b][1]benzothien-2-yl)undecyl]-1,1,3,3-tetramethyldisiloxane, 1,3-bis[11-(4-{544 (trimethylsilyl)phenyl]-2,2-bithien-5-yl}phenyl) undecyl]-1,1,3,3-tetramethyldisiloxane. The organic semiconductor layer 4 is not limited to the above examples.

The organic semiconductor layer 4 can be produced by any of the known techniques, in particular, by Langmuir-Blodgett technique (Sizov A. S., Agina E. V., Gholamrezaie F. [et. al.] Oligothiophene-Based Monolayer Field-Effect Transistors Prepared by Langmuir-Blodgett Technique//Applied Physics Letters.—2013.—V. 103, No. 4.—P. 043310), by Langmuir-Schäfer technique (Tanese M. C., Farinola G. M., Pignataro B. [et. al.] Poly(Alkoxyphenylene-Thienylene) Langmuir-Schäfer Thin Films for Advanced Performance Transistors//Chemistry of Materials.—2006.—V. 18, No. 3.—P. 778-784.), by spin coating technique (Hall D. B., Underhill P., Torkelson J. M. Spin Coating of Thin and Ultrathin Polymer Films//Polymer Engineering and Science.—1998.—V. 38, No. 12.—P. 2039-2045.), by doctor blade technique (Yan Y., Huang L. B., Zhou Y. [et. al.] Self-Aligned, Full Solution Process Polymer Field-Effect Transistor on Flexible Substrates//Sci Rep.—2015.—V. 5.—P. 15770), by pouring technique (Diao Y., Shaw L., Bao Z., Mannsfeld S. C. B. Morphology Control Strategies for Solution-Processed Organic Semiconductor Thin Films//Energy Environ. Sci.—2014.—V. 7, No. 7.—P. 2145-2159).

In the preferable embodiment of the invention the organic semiconductor layer 4 thickness can be from 2 to 20 nm, that ensures high sensitivity of the device. Since electric current in the device is localized in thin near-surface layer at the boundary of "organic semiconductor layer 4—dielectric layer 6", the organic semiconductor layer 4 thickness within the range from 2 to 20 nm ensures direct interaction of the detected gas with the semiconductor layer 4. The lower range value 2 nm corresponds to the minimal thickness of the organic semiconductor layer 4 at which organic field-effect transistors demonstrate electrical and gas-sensing properties. The upper range value 20 nm enables to detect low concentrations of target gases to 10 ppb. As the organic semiconductor layer 4 thickness increases the gas sensor sensitivity in ppb-range decreases.

In the preferable embodiment of the invention the dielectric layer 6 can be made of thermally grown dry silicon dioxide modified by self-assembled monolayer (SAM) of octyldimetylchlorosilane (ODMS) or other alkylchlorosilane, ensuring rather low roughness (<0.5 nm) of the dielectric layer 6 surface.

The device for selective determination of concentration of gaseous thiol-containing and/or amino-containing compounds operates as follows.

Figure 3:
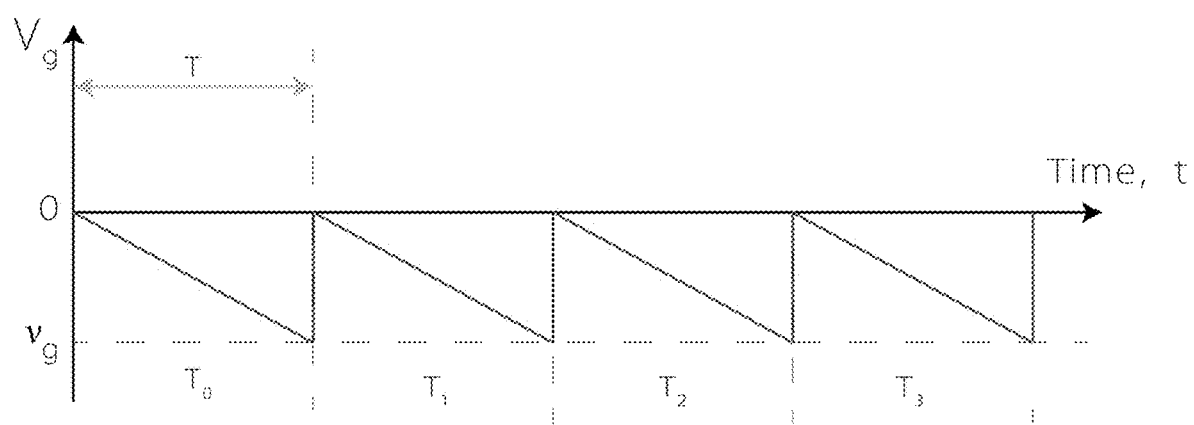
FIG. 3—illustrates the curve signal of gate voltage $V_g$.

Dry air with content of one of toxic chemical gaseous compounds containing mercapto- (HS—) and/or amino group ($NH_2$—) within the concentration range from 10 ppb to 1 ppm is supplied to the airtight chamber 9. Constant negative potential $V_d$ is applied to the drain electrode 3 by means of the power source 10 of the measuring unit 8 (FIG. 2) saw-tooth potential with $v_g$ amplitude, T period (FIG. 3) is applied to the gate electrode 5 by means of the blocking oscillator 11 of the measuring unit 8 (FIG. 2). $V_d$ and $v_g$ values are selected so that the electrical field in the dielectric layer 6 is minimum 50 kV/mm, and the electrical field in the organic semiconductor layer 4 is minimum 0.5 kV/m. For each of N successive periods $T_i$ (i=0 . . . N−1) with duration T the current value $I_d$ in the organic field-effect transistor channel 1 depending on time t is measured by means of current sensor 13 and the amplifier 14 of the measuring unit 8. Then, the dependency of $I_d$ on $V_g$ is determined for each of N successive periods $T_i$ using the microprocessor 7 synchronized with the blocking oscillator 11 by means of the clock unit 12 of the measuring unit 8, based on the available values of current $I_d$ and $V_g$ on time. Each of N dependencies is then being approximated with the theoretical expression by means of the microprocessor 7 (Horowitz G. Organic Field-Effect Transistors//Advanced Materials.—1998.—V. 10, No. 5.—P. 365-377) by least squares technique (LST) by the formula (1):

$$I_d = \frac{W}{2L}\mu C(V_g - V_T)^2, \qquad (1)$$

where $I_d$— current in the organic field-effect transistor channel, A;

μ—charge carrier mobility, $cm^2/(V \times s)$;

$V_T$— threshold voltage, at which current starts to rise, V (FIG. 3);

$V_g$— voltage at the gate electrode 2, V;

C—unit-area capacitance of the dielectric layer 5, nF $cm^{-2}$);

W and L—width and length of the organic semiconductor layer 3 respectively, m.

Figure 4:
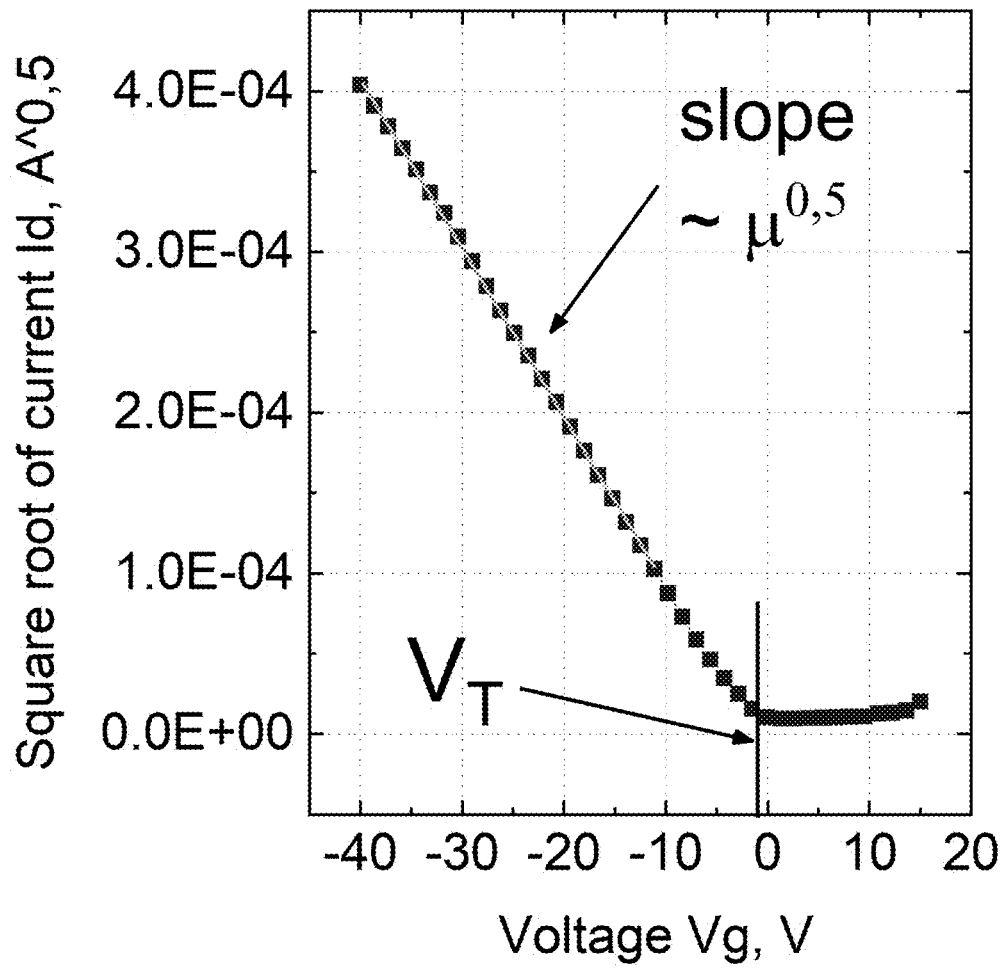
FIG. 4—illustrates current-voltage curve of the organic field-effect transistor.

Typical current-voltage curve of the organic field-effect transistor 1 is shown in FIG. 4.

The values of the charge carrier mobility $\mu_i$ and threshold voltage $V_{Ti}$ are calculated for each of the periods $T_i$ by means of the microprocessor 7 by the formula (1).

Figure 5:
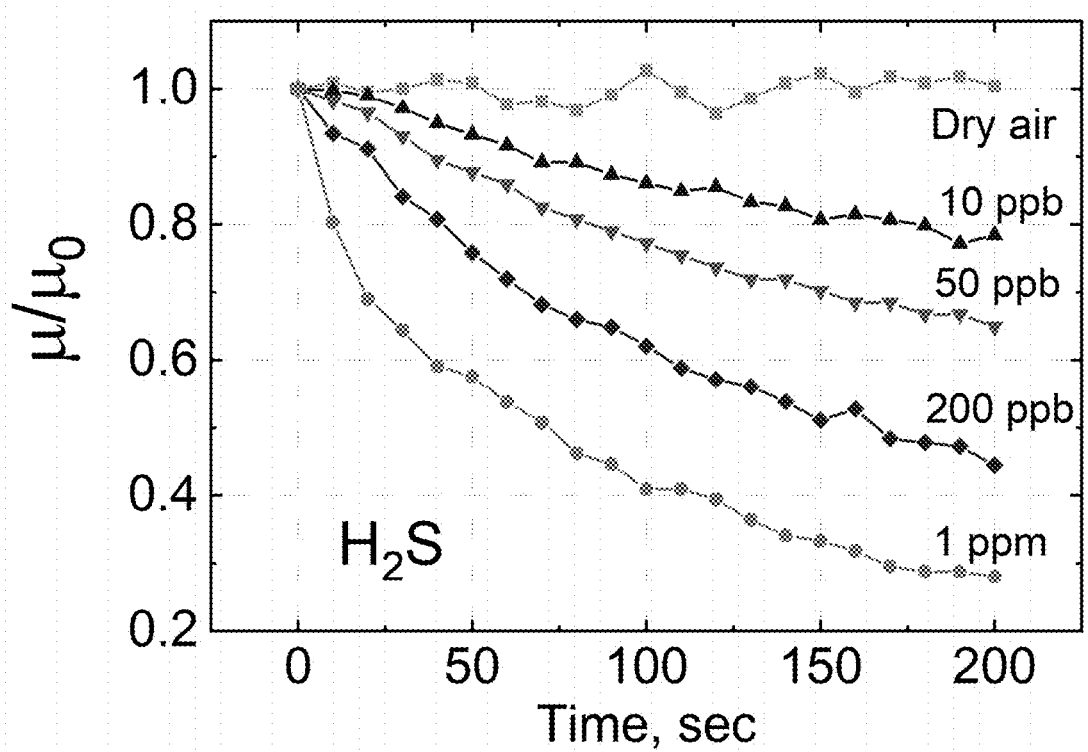
FIG. 5—illustrates a charge carrier mobility changing during the interaction of gaseous thiol-containing compound with the organic field-effect transistor.
Figure 6:
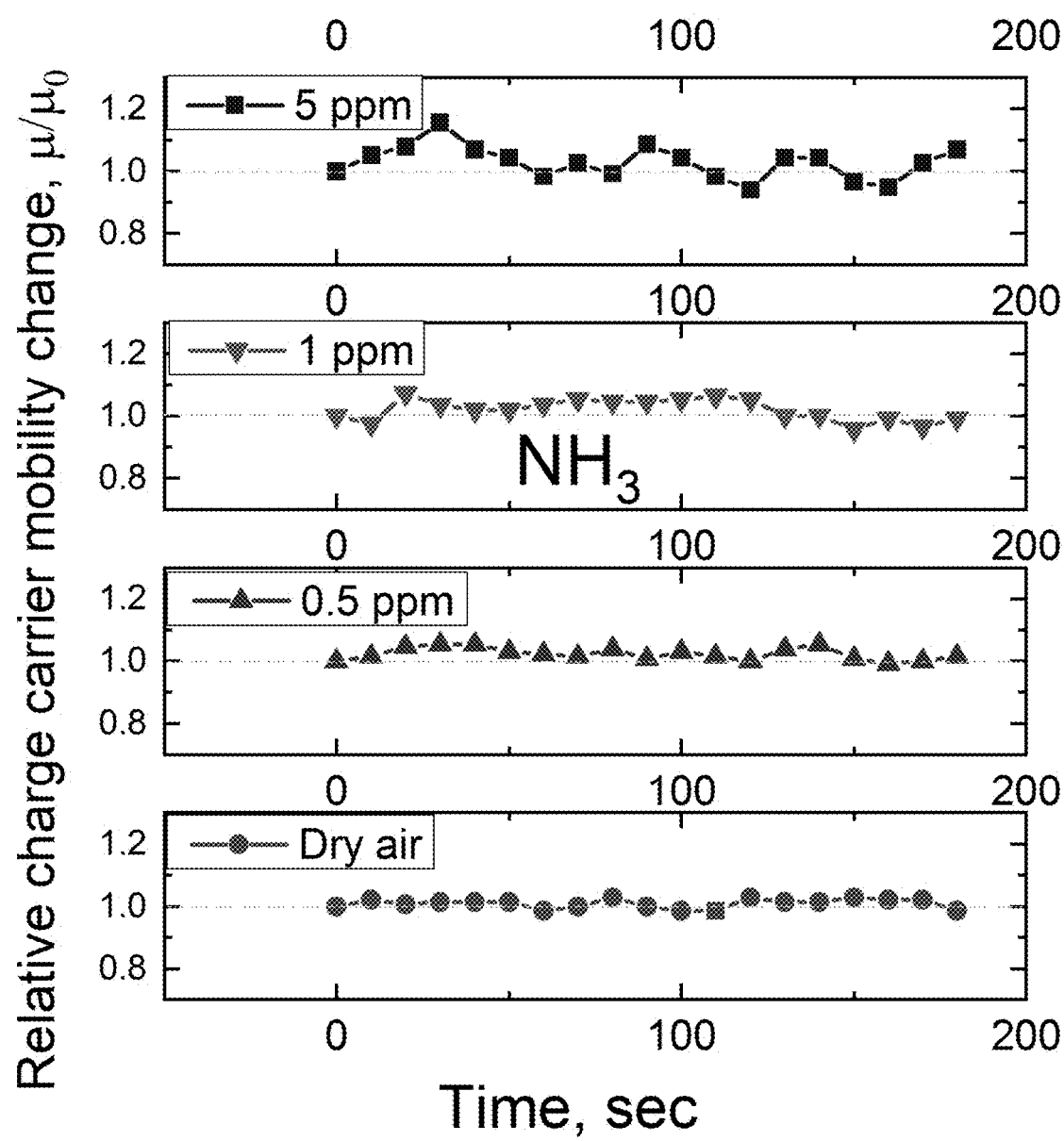
FIG. 6—illustrates a charge carrier mobility change during the interaction of gaseous amino-containing compound with the organic field-effect transistor.

Then, the charge carrier mobility relative change is calculated by means of the microprocessor 7 by the formula (2):

$$\mu_{rel} = \mu_{N-1}/\mu_0, \qquad (2)$$

where $\mu_{rel}$—relative charge carrier mobility, $cm^2/(B \times c)$;

$\mu_{N-1}$—charge carrier mobility at (N−1) period of $V_g$ voltage application, $cm^2/(B \times c)$;

$\mu_0$—charge carrier mobility at 0 period of $V_g$ voltage application, $cm^2/(B \times c)$ And the threshold voltage shift of the organic field-effect transistor 1 $\Delta V_T$ is given by the formula (3):

$$\Delta V_T = V_{T_{N-1}} - V_{T_0}, \qquad (3)$$

where $\Delta V_T$—threshold voltage shift of the organic field-effect transistor, V;

$V_{T_{N-1}}$—threshold voltage of the organic field-effect transistor at (N−1) period of $V_g$ voltage application, V;

$V_{T_0}$—threshold voltage of the organic field-effect transistor at 0 period of $V_g$ voltage application, V;

Ability to differentiate different classes of the detected chemical compounds by means of the claimed device is due to the fact that at interaction of gaseous thiol-containing compound with a gas sensor based on organic field-effect transistor 1 the relative charge carrier mobility $\mu_{rel}$ in organic semiconductor layer 4 (FIG. 5) is changed, while at interaction of gaseous amino-containing compound with a gas sensor based on organic field-effect transistor 1 the relative charge carrier mobility $\mu_{rel}$ in organic semiconductor layer 5 remains constant (FIG. 6). Provided that, the concentration of gaseous thiol-containing compound can be determined by the value of relative charge carrier mobility change $\mu_{rel}$ (FIG.

Figure 8:
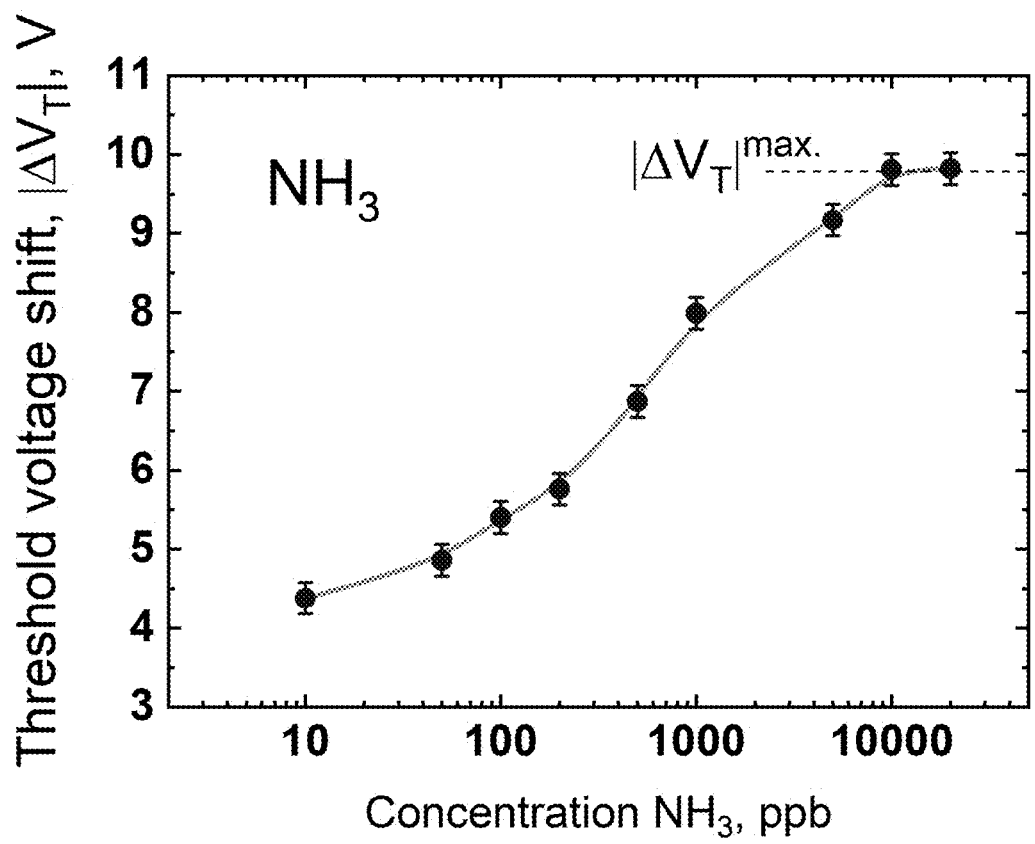
FIG. 8—illustrates a OFET threshold voltage shift dependence on concentration of gaseous amino-containing compound.

7), and concentration of gaseous amino-containing compound can be determined by the value of threshold voltage shift $\Delta V_T$ (FIG. 8).

The obtained values $\mu_{rel}$ and $\Delta V_T$ are analyzed by means of the microprocessor 7. For $1>\mu_{rel}>0.9$ and $|\Delta V_T|>0.2|\Delta V_T|_{max}$, where $|\Delta V_T|^{max}$—maximum threshold voltage shift in accordance with the calibration curve (FIG. 8), the detected compound belongs to the class of gaseous amino-containing compounds. For $0<\mu_{rel}<0.9$ the detected compound belongs to the class of gaseous thiol-containing compounds.

Figure 7:
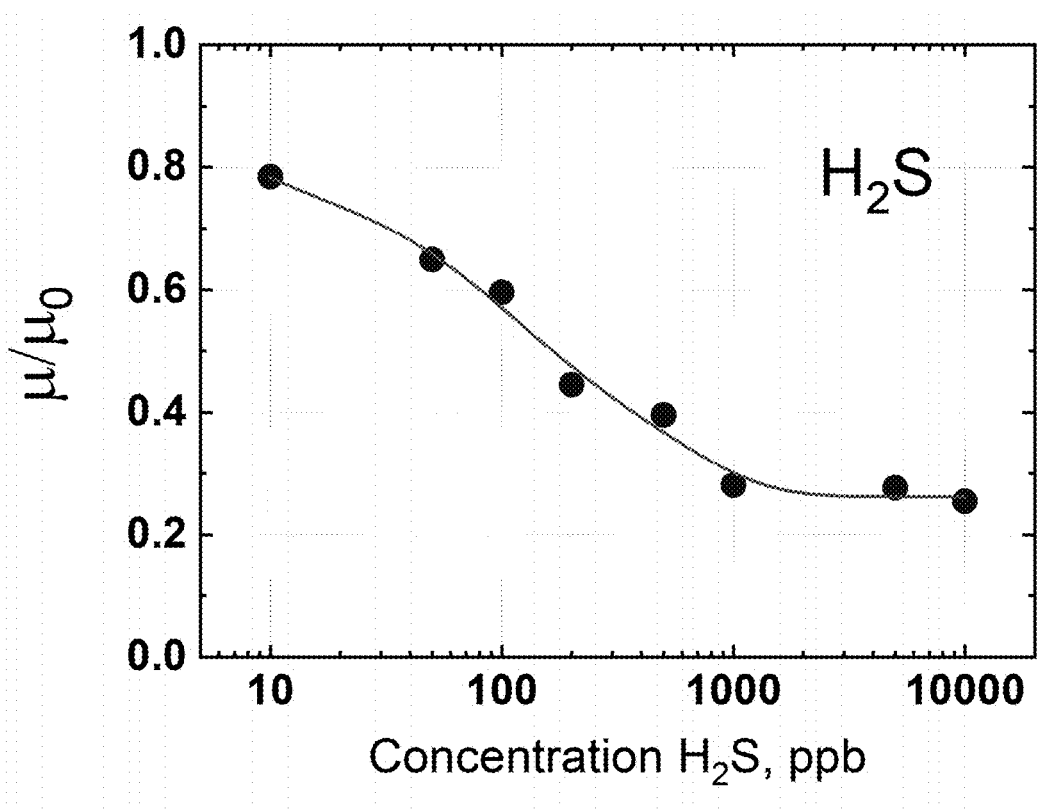
FIG. 7—illustrates a relative charge carrier mobility change dependence on concentration of gaseous thiol-containing compound.

Then, the concentration of the detected compound is determined by values $\mu_{rel}$ and $\Delta V_T$ using the calibration curves (FIG. 7 and FIG. 8), preliminarily fed into the microprocessor 7 memory according to the following algorithm. If the detected compound belongs to the class of gaseous amino-containing compounds, then on the calibration curve of threshold voltage shift from concentration (FIG. 8) the point is searched for, whose ordinate is the closest to the obtained value $\Delta V_T$, and its abscissa is considered to be a measured concentration value. If the detected compound belongs to the class of gaseous thiol-containing compounds, on the calibration curve of relative charge carrier mobility change from concentration (FIG. 8) there the point is searched for, whose ordinate is the closest to the obtained value $\mu_{rel}$, and its abscissa is considered to be a measured concentration value.

The determined class of the detected compound and its concentration measured in accordance with the algorithm is displayed to the user.

Implementation of the claimed method is possible due to the differences between mechanisms of interaction of amino-containing compounds and thiol-containing compounds with an organic field-effect transistor. This is due to the differences between dipole moment values, dissociation constants and donor-acceptor properties of these two classes. In particular, ammonia molecule dipole moment is higher than hydrogen sulphide molecule dipole moment, hydrogen sulphide dissociation constant is higher than ammonia dissociation constant, ammonia is a strong electron donor while hydrogen sulphide is a weak electron donor. Donor-acceptor interaction typical of amino-containing compounds causes threshold voltage shift, while additional interaction with dissociated molecules typical of thiol-containing compounds causes change of contact resistances in an organic semiconductor layer, and consequently, change of charge carrier mobility.

The invention claimed is:

1. A method for selective determination of a concentration of a gaseous thiol-containing and/or amino-containing compound using a gas sensor based on an organic field-effect transistor, comprising the following steps:
   measuring values of a current in a channel of the organic field-effect transistor depending on time;
   calculating a threshold voltage of the organic field-effect transistor and mobility of charge carriers depending on time based on the measured current values;
   calculating a value of relative change in mobility of charge carriers and shift of threshold voltage of the organic field-effect transistor;
   determining the thiol-containing and/or amino-containing compound by the values of relative change in mobility of charge carriers and shift of the threshold voltage of the organic field-effect transistor;
   determining the concentration of the thiol-containing compound by the value of relative change in mobility of charge carriers and/or the concentration of the amino-containing compound by the shift of the threshold voltage of the organic field-effect transistor.

2. The method according to claim 1, wherein values of current in the organic field-effect transistor channel depending on time are measured at a constant voltage at a drain electrode of the organic field-effect transistor and a sawtooth voltage at a gate electrode of the organic field-effect transistor.

3. A device for selective determination of a concentration of a gaseous thiol-containing and/or amino-containing compound, the device comprising:
   a gas sensor based on an organic field-effect transistor consisting of two electrodes divided by an organic semiconductor layer, a gate electrode and a dielectric layer;
   a measuring unit connected to the gas sensor, wherein the measuring unit is configured to measure values of current in a channel of the organic field-effect transistor as a function of time;
   a microprocessor connected to the measuring unit and configured to calculate values of an threshold voltage of the organic field-effect transistor and mobility of charge carriers as a function of time based on the values of current in the organic field-effect transistor channel as a function of time, to calculate a value of relative change in mobility of charge carriers and a shift of the threshold voltage of the organic field-effect transistor, to determine the thiol-containing and/or amino-containing compound by the values of relative change in mobility of charge carriers and threshold voltage shift of the organic field-effect transistor, to determine the concentration of the thiol-containing compound by the value of relative change in mobility of charge carriers and/or the concentration of the amino-containing compound by the shift of threshold voltage of the organic field-effect transistor;
   an airtight chamber with a gas inlet and a gas outlet, where said gas sensor, measuring unit and microprocessor are located.

4. The device according to claim 3, wherein the organic semiconductor layer of the organic field-effect transistor is a self-organizing monolayer of organosilicone chemically inert derivatives of oligothiophenes, benzothienobenzothiophenes or bisphenylbithiophenes soluble in organic solvents.

5. The device according to claim 3, wherein a thickness of the organic semiconductor layer of the organic field-effect transistor is 2-20 nm.

* * * * *